US005692057A

United States Patent [19]

Grad et al.

[11] Patent Number: 5,692,057

[45] Date of Patent: Nov. 25, 1997

[54] WIRELESS ELECTRONIC POWER DEFEAT TECHNIQUES

[75] Inventors: Steven M. Grad, Deerfield; Irwin P. Singh, Carol Stream, both of Ill.

[73] Assignee: Shure Brothers, Inc., Evanston, Ill.

[21] Appl. No.: 672,431

[22] Filed: Jun. 28, 1996

[51] Int. Cl.[6] .............................. H04B 3/00; H04R 3/00; H02B 1/00

[52] U.S. Cl. ............................ 381/77; 381/122; 381/123; 455/89

[58] Field of Search ............................ 381/77, 122, 123; 455/89; 361/8, 13

[56] References Cited

U.S. PATENT DOCUMENTS

| | | | |
|---|---|---|---|
| 4,513,446 | 4/1985 | Leslie | 455/73 |
| 4,815,143 | 3/1989 | Derhaag et al. | 381/169 |
| 5,404,578 | 4/1995 | Kuge et al. | 455/89 |

*Primary Examiner*—Forester W. Isen

*Attorney, Agent, or Firm*—Banner & Witcoff, Ltd.

[57] ABSTRACT

A wireless audio system, including an audio and radio frequency module, that is prevented from being accidentally turned off by using an electronic gate responsive to a gate signal for coupling electrical power from a source to the module which bypasses the normal mechanical power switch. Means are provided for generating the gate signal in response to operation by the user so that the user cannot accidentally turn off the system by moving the power switch to its off position.

15 Claims, 2 Drawing Sheets

WIRELESS ELECTRONIC POWER DEFEAT TECHNIQUES

BACKGROUND OF THE INVENTION

1. Field of the Invention

This invention relates to wireless systems, such as wireless microphones and receivers, and more particularly relates to techniques for preventing a user from accidentally turning off such a wireless system.

2. Description of Related Art

Experience has shown that during a performance, the mechanical power switch of a wireless microphone or receiver can be turned off accidentally. The complete loss of sound through the system is disruptive of the performance and is embarrassing to the performer. In the past, the mechanical power switch has been taped in the on position or otherwise mechanically constrained to prevent the system from being turned off accidentally. This "fix" to the problem frequently is defeated when the tape or other mechanical constraint fails. In addition, the performer is prevented from intentionally turning off the system when the need arises during a performance.

Wireless microphones or receivers are quite small. As a result, there is a lack of space for mounting mechanical switch locks which could be used to prevent a microphone or receiver from being turned off accidentally. This invention is directed to solving the problems exhibited by prior wireless systems in a manner compatible with the small size of such devices.

SUMMARY OF THE INVENTION

The invention can be used to advantage in a wireless microphone system or receiver system that includes an audio and radio frequency module. In such an environment, there is a source of electrical power for the system, such as batteries. A power switch is coupled to the source. The power switch has a first "off" position for normally preventing electrical power from being coupled to the module. The power switch also has a second "on" position for enabling power to be coupled to the module so that the system is operative. An electronic gate responsive to a gate signal couples electrical power from the source to the module to prevent the microphone from being turned off accidentally. Means are provided for generating the gate control signal in response to operation by the user when he wants to prevent accidental turn off of the system. After the gate signal is generated, the electronic gate continues to deliver electrical power to the module so that the system remains operative even when the power switch is moved to the first "off" position. By using the foregoing techniques, the user cannot accidentally turn off the system by moving the power switch to the "off" position during performance.

BRIEF DESCRIPTION OF THE DRAWINGS

These and other advantages and features of the invention will become apparent upon reading the following detailed description and referring to the accompanying drawings in which like numbers refer to like parts throughout and in which.

DESCRIPTION OF THE PREFERRED EMBODIMENTS

Figure 1:
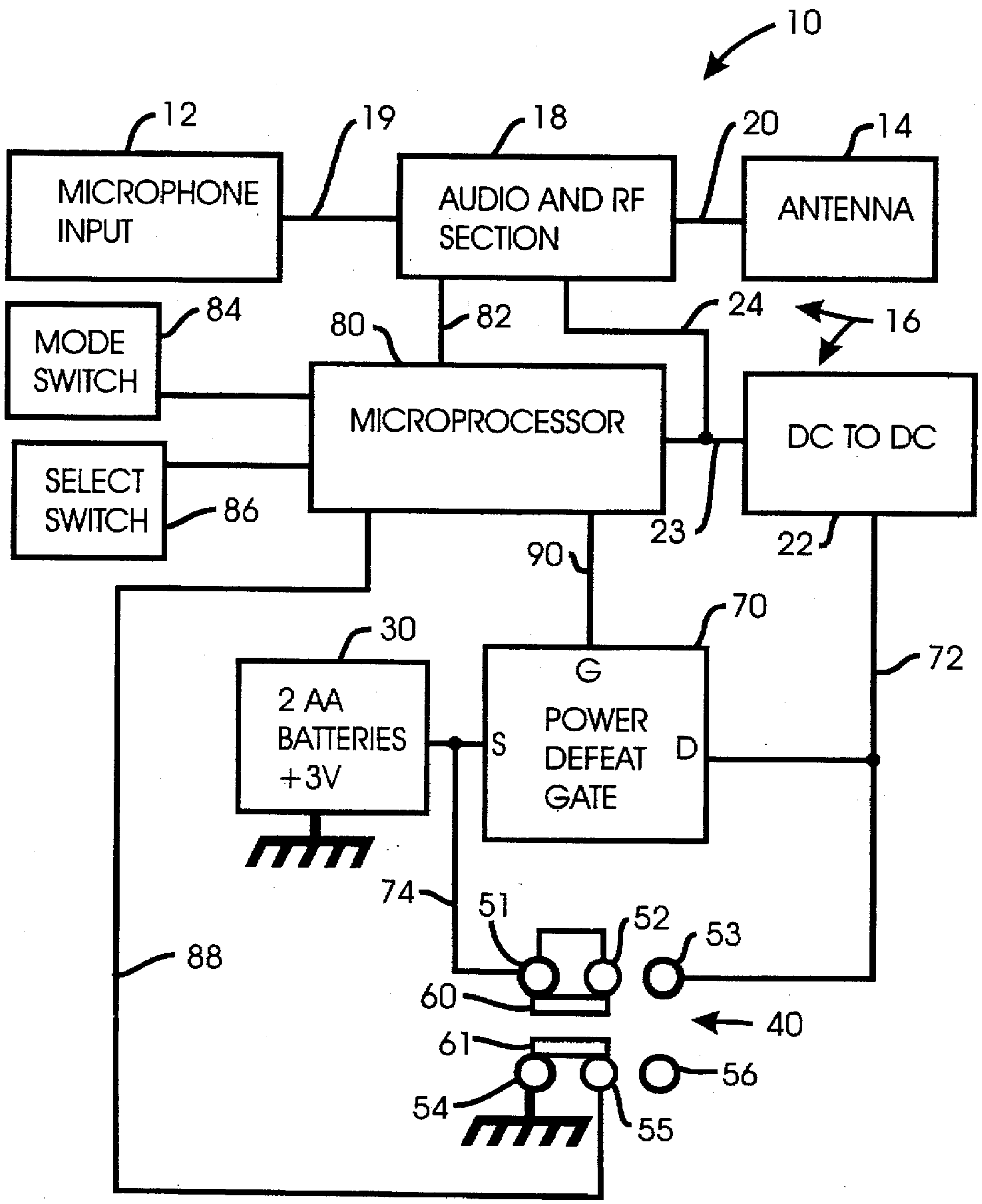
FIG. 1 is a diagrammatic illustration of a preferred form of a wireless microphone made in accordance with the invention.

Referring to FIG. 1, a preferred form of wireless microphone assembly 10 embodying the present invention includes a conventional microphone input jack 12 to which a conventional lapel microphone (not shown) may be coupled. The microphone may be for a body pack, or may be a dynamic or condenser microphone head for a hand held transmitter. The microphone assembly also includes a conventional antenna 14 which may be a 50 ohm helical quarter wave antenna for transmission of radio frequency microphone signals.

An audio and radio frequency module 16 includes an audio and radio frequency section 18 that receives input signals from microphone input 12 over a conductor 19 and which sends radio frequency signals to antenna 14 over a conductor 20. Module 16 also includes a DC to DC converter 22 that distributes 5 volt DC electrical power over conductors 23 and 24.

A source of electrical power 30 may comprise 2 AA batteries which provide up to 3 volts of electrical power. Converter 22 steps up the 3 volts from the batteries to 5 volts.

A mechanical power switch 40 comprises terminal contacts 51–56 arranged as shown. Switch 40 also includes conventional slide contacts 60–61 that are mechanically coupled so that they move together.

A power defeat electronic gate switch 70 comprises a conventional field effect transistor, such as model MTD3055EL manufactured by Motorola. Mechanical switch 40 and electronic switch 70 provide power to converter 22 over a conductor 72 and receive power from source 30 over a conductor 74 as shown.

A conventional microprocessor 80 receives electrical power from converter 22 and provides control signals over a conventional bus 82 that control the operation of audio and radio frequency section 18 in a well-known manner. Two ports of microprocessor 80 receive input signals from a conventional mode switch 84 and a conventional select switch 86. Switches 84 and 86 are conventional intermittent switches that are normally spring biased in the open position. Another port of microprocessor 80 receives a switch off signal from terminal 55 over a conductor 88. An output from microprocessor 80 transmits a gate signal over a conductor 90 to the gate G of field effect transistor 70. The field effect transistor also includes a source S and a drain D connected as shown.

In operation, when transistor 70 is turned off, electrical power is coupled from source 30 to converter 22 through switch 40 by moving slides 60 and 61 to the right until they contact terminals 52–53 and 55–56, respectively (i.e., the "on" position). As long as transistor 70 remains off, power to microphone assembly 10 can be turned off by moving slides 60–61 to the position shown in FIG. 1 (i.e., the "off" position).

A user can prevent accidental turn off of the microphone by simultaneously actuating switches 84 and 86 continuously for approximately three seconds. Although three seconds is the preferred time interval, microprocessor 80 can be programmed to generate a gate signal over conductor 90 when switches 84 and 86 are simultaneously and continuously depressed for any time delay, such as three to ten seconds. When the gating signal is transmitted over conductor 90, transistor 70 is switched to its on state so that electrical power is coupled from source 30 to converter 22 through transistor 70, thereby bypassing switch 40. As a result, even though switch 40 is switched to the "off" position shown in FIG. 1, the microphone continues to operate.

When switch 40 is in the position shown in FIG. 1, the microprocessor receives a ground potential switch off signal over conductor 88. The signal can be used by the microprocessor to switch off the power required by module 16. Of course, power is not turned off if a gating signal is being transmitted over conductor 90.

In order to switch transistor 70 to its off state, switches 84 and 86 are simultaneously depressed by the user for the same time period used to cause microprocessor 80 to generate the gating signal on conductor 90 (i.e., 3–10 seconds). Thereafter, the gating signal is no longer present on conductor 90, and transistor 70 is switched to its off state. Thereafter, power is supplied, if at all, to module 16 through mechanical power switch 40.

Figure 2:
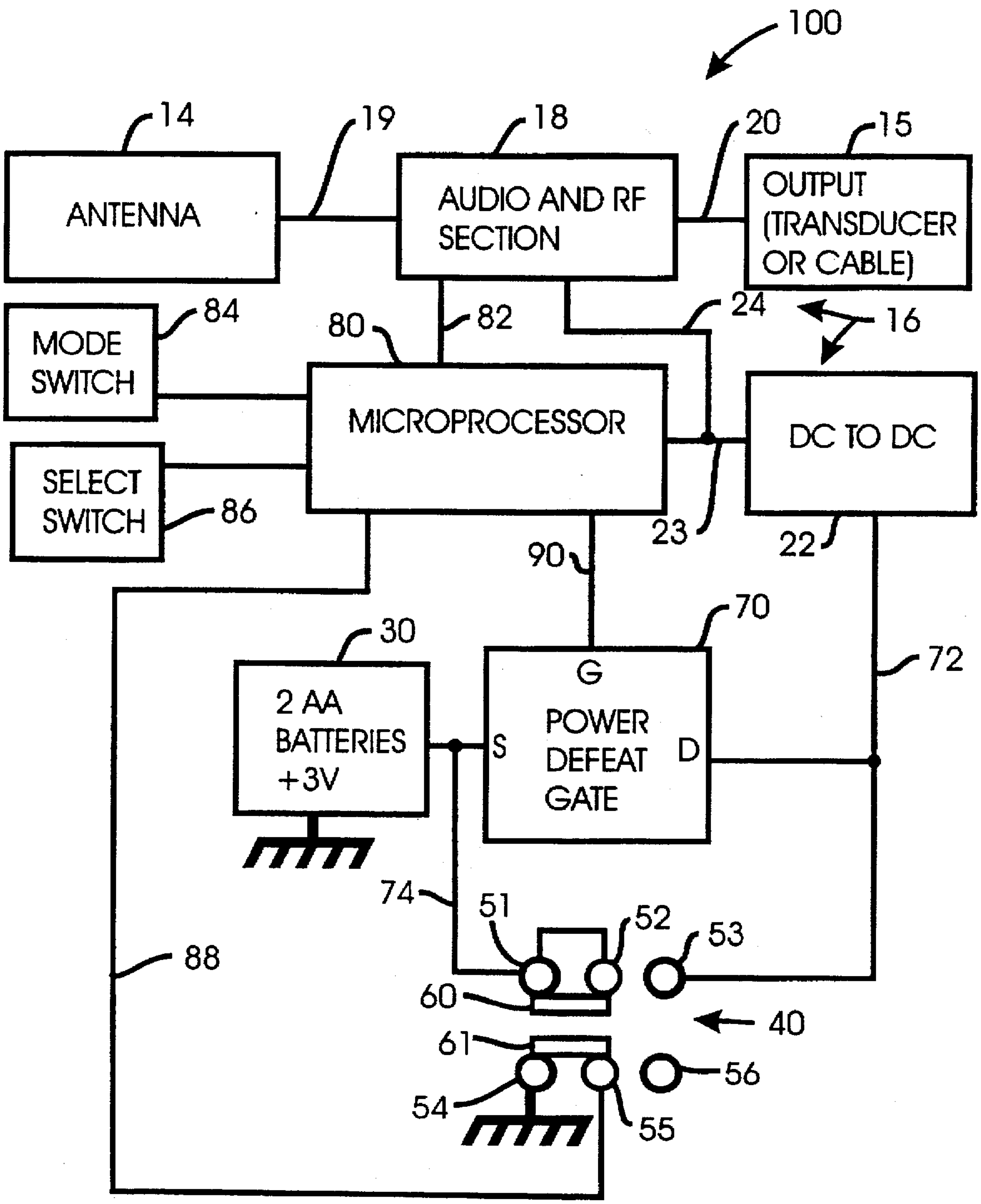
FIG. 2 is a diagrammatic illustration of a preferred form of a wireless receiver made in accordance with the invention.

FIG. 2 shows a wireless microphone receiver assembly 100 employing an output transducer or cable 15. The remaining apparatus in the receiver, as well as its operation, can be understood from the foregoing description of wireless microphone assembly 10 shown in FIG. 1. Basically, receiver 100 receives radio frequency signals from a microphone system, such as the one shown in FIG. 1, recovers the audio information modulated in the radio frequency signals, and conducts the resulting audio signals through output 15 to an amplifier and speaker system (not shown) by which the signals produce an audible sound.

By using the foregoing techniques, a user can prevent a wireless system from accidentally being turned off during performance. In addition, the system intentionally can be turned off by merely activating one or more switches. Requiring the user to activate two switches simultaneously is an important feature which allows the user to conveniently disable power defeat switch 70 when desired, but preventing accidental turn off of the system during performance.

Those skilled in the art will recognize that the preferred embodiments may be altered and amended without departing from the true spirit and scope of the invention, as defined in the accompanying claims.

We claim:

1. In a wireless audio system including an audio and radio frequency module, improved apparatus for preventing a user from accidentally turning off said system comprising in combination:

a source of electrical power for said system;

a power switch coupled to said source, said power switch having a first position for normally preventing electrical power from being coupled to said module and a second position for enabling electrical power to be coupled to said module;

an electronic gate responsive to a gate signal for coupling electrical power from said source to said module; and means for generating said gate signal in response to operation by said user, whereby electrical power is delivered to said module when said power switch is in said first position so that said user cannot accidentally turn off said system by moving said power switch to said first position.

2. Apparatus, as claimed in claim 1, wherein said source comprises one or more batteries.

3. Apparatus, as claimed in claim 1, wherein said power switch comprises a sliding switch.

4. Apparatus, as claimed in claim 1, wherein said electronic gate comprises a field effect transistor.

5. Apparatus, as claimed in claim 1, wherein said means for generating comprises:

input switch means operable by said user for generating an input signal indicative of a desire to prevent accidental turn off of said system; and a microprocessor for controlling said module and for generating said gate signal in response to said input signal.

6. Apparatus, as claimed in claim 5, wherein said microprocessor comprises means for generating said gate signal in response to operation of said input switch means continuously for a predetermined time period.

7. Apparatus, as claimed in claim 5, wherein said input switch means comprises a mode switch and a select switch, and wherein said microprocessor comprises means for generating said gate signal in response to operation of said mode switch and said select switch for a predetermined time period.

8. Apparatus, as claimed in claim 6, wherein said predetermined time period is greater than 3 seconds and less than 10 seconds.

9. Apparatus, as claimed in claim 6, and further comprising means for generating a switch off signal in response said power switch being in said first position, whereby said microprocessor can reduce the power required by said module in the absence of said gate signal.

10. Apparatus, as claimed in claim 1, wherein said module comprises a dc to dc converter coupled to said electronic gate and said power switch for supplying electrical power to said module.

11. In a wireless audio system including an audio and radio frequency module, a source of electrical power for said system and a power switch coupled to said source, said power switch having a first position for normally preventing electrical power from being coupled to said module and a second position for enabling electrical power to be coupled to said module, an improved method for preventing a user from accidentally turning off said system comprising in combination the steps of:

coupling electrical power from said source to said module through an electronic gate in response to a gate signal; and generating said gate signal in response to operation by said user, whereby electrical power is delivered to said module when said power switch is in said first position so that said user cannot accidentally turn off said system by moving said power switch to said first position.

12. A method, as claimed in claim 11, wherein said step of generating comprises the steps of:

generating an input signal indicative of a desire to prevent accidental turn off of said system in response to user actuation; and generating said gate signal in response to said input signal.

13. A method, as claimed in claim 12, wherein said step of generating said gate signal comprises the step of generating said gate signal in response to user actuation continuously for a predetermined time period.

14. A method, as claimed in claim 13, wherein said predetermined time period is greater than 3 seconds and less than 10 seconds.

15. A method, as claimed in claim 11, and further comprising the step of generating a switch off signal in response said power switch being in said first position, whereby the power required by said module in the absence of said gate signal is reduced.

* * * * *